United States Patent  (10) Patent No.: US 8,949,210 B2
Nano et al.  (45) Date of Patent: Feb. 3, 2015

(54) ANALYSIS STACK FOR COMPLEX EVENT FLOWS

(75) Inventors: Olivier Nano, Aachen (DE); Ivo José Garcia dos Santos, Aachen (DE); Tihomir Tarnavski, Redmond, WA (US); Sebastien Peray, Dueren (DE); Marcel Tilly, Heinsberg (DE); Ramkumar Krishnan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 134 days.

(21) Appl. No.: 12/779,050

(22) Filed: May 13, 2010

(65) Prior Publication Data

US 2011/0283144 A1 Nov. 17, 2011

(51) Int. Cl.
 G06F 17/00 (2006.01)
 G06F 11/36 (2006.01)
 G06F 11/32 (2006.01)
 G06Q 10/00 (2012.01)

(52) U.S. Cl.
 CPC .......... *G06F 11/3636* (2013.01); *G06F 11/323* (2013.01); *G06Q 10/00* (2013.01)
 USPC ........... 707/700; 707/600; 707/687; 707/736; 707/758; 706/45

(58) Field of Classification Search
 None
 See application file for complete search history.

(56) References Cited

U.S. PATENT DOCUMENTS

| 7,287,246 B2 | 10/2007 | Tan et al. | |
| 7,472,112 B2 | 12/2008 | Pfleiger et al. | |
| 7,661,032 B2 * | 2/2010 | Eberbach et al. | 714/38.14 |
| 7,945,434 B2 * | 5/2011 | Lovas et al. | 703/17 |
| 8,543,534 B2 * | 9/2013 | Alves et al. | 707/601 |
| 2005/0278708 A1 | 12/2005 | Zhao et al. | |
| 2006/0095853 A1 * | 5/2006 | Amyot et al. | 715/744 |
| 2006/0229923 A1 | 10/2006 | Adi et al. | 705/8 |
| 2007/0118545 A1 | 5/2007 | Chandrasekharan et al. | 707/101 |
| 2007/0276692 A1 * | 11/2007 | Mei et al. | 705/1 |
| 2008/0114574 A1 | 5/2008 | Chen et al. | |
| 2008/0189352 A1 * | 8/2008 | Mitchell et al. | 709/201 |
| 2008/0301124 A1 * | 12/2008 | Alves et al. | 707/5 |
| 2008/0301648 A1 | 12/2008 | Heidasch | |
| 2009/0006320 A1 * | 1/2009 | Ding et al. | 707/2 |
| 2009/0113248 A1 * | 4/2009 | Bock et al. | 714/39 |
| 2009/0138857 A1 * | 5/2009 | Botzer et al. | 717/129 |
| 2009/0210364 A1 * | 8/2009 | Adi et al. | 706/12 |

(Continued)

OTHER PUBLICATIONS

"Oracle Complex Event Processing Performance", An Oracle White Paper, Nov. 2008.*
Gyllstrom et al, "SASE: Complex Event Processing Over Streams", 2007.*
"Microsoft SQL Server 2008 R2 Introducing Microsoft StreamInsight", 2008.*

(Continued)

*Primary Examiner* — Hung Le
(74) *Attorney, Agent, or Firm* — Nicholas Chen; Kate Drakos; Micky Minhas (57) ABSTRACT

Methods, systems, and computer-readable media to analyze a CEP query are disclosed. A particular analysis module is configured to receive data associated with an event flow generated by execution of a CEP query. The data is received from a first analysis module (e.g., in a stack of analysis modules) or from the event flow via a software communication interface. The analysis module is also configured to execute an analysis operation on the data to generate a result. The analysis module can output the result to a second analysis module (e.g., in the stack of analysis modules) or to a user interface via the software communication interface.

20 Claims, 10 Drawing Sheets

(56) References Cited

U.S. PATENT DOCUMENTS

| | | | |
|---|---|---|---|
| 2009/0222793 A1* | 9/2009 | Frank et al. | 717/114 |
| 2009/0265324 A1 | 10/2009 | Mordvinov et al. | |
| 2010/0070981 A1* | 3/2010 | Hadar et al. | 719/318 |
| 2010/0280857 A1* | 11/2010 | Liu et al. | 705/7 |
| 2011/0029485 A1* | 2/2011 | Park et al. | 707/634 |
| 2011/0093306 A1* | 4/2011 | Nielsen et al. | 705/7.13 |
| 2011/0167433 A1* | 7/2011 | Appelbaum et al. | 719/318 |
| 2011/0178775 A1* | 7/2011 | Schoning et al. | 702/190 |

OTHER PUBLICATIONS

Eckert, Michael., "Complex Event Processing with XChangeEQ: Language Design, Formal Semantics, and Incremental Evaluation for Querying Events", Retrieved at << http://edoc.ub.uni-muenchen.de/9405/1/Eckert_Michael.pdf >>, Oct. 22, 2008, pp. 1-301.

Morrell, et al., "Complex Event Processing with Coral8", Retrieved at << http://www.google.co.in/url?sa=t&source=web&ct=res&cd=1&ved=0CAYQFjAA&url=http%3A%2F%2Fdownload.microsoft.com%2Fdownload%2F5%2F6%2F6%2F566AEA2A-C50E-47B8-890E-BCF4E0EC5D0B% 2FComplex_Event_Processing_with_Coral8_Final.pdf&rct=j&q=debug+complex+event+processing+%2B+stack+analysis&ei=wdmyS-6nFsGOkQWW_4isBA&usg=AFQjCNFm0K_MgqnYOIAOsenGI-fyISCDJg >>, Jun. 2008, pp. 1-16.

Gerea, Ciprian, "Adapters for Event Processing Systems", U.S. Appl. No. 12/603,416, filed Oct. 21, 2009, pp. 21.

Schindlauer, Roman, "Event Processing With XML Query Based on Reusable XML Query Template", U.S. Appl. No. 12/603,308, filed Oct. 21, 2009, pp. 24.

Grabs, Torsten W., "Time-Based Event Processing Using Punctuation Events", U.S. Appl. No. 12/603,445, filed Oct. 21, 2009, pp. 22.

Zabback, Peter, "Partitioned Query Execution in Event Processing Systems", U.S. Appl. No. 12/603,385, filed Oct. 21, 2009, pp. 23.

* cited by examiner

ANALYSIS STACK FOR COMPLEX EVENT FLOWS

BACKGROUND

Complex event processing (CEP) has become a popular problem solving paradigm in computer software. CEP provides the ability to analyze high-volume and high-speed event streams. CEP may be used in domains, such as manufacturing and process control, utilities, algorithmic financial trading, web applications, information technology, and data center monitoring.

The time-sensitive and real-time nature of events that flow through a CEP system may make determining the correctness and validity of CEP results a challenging task. Moreover, it may be difficult to aggregate CEP event information in a manner that facilitates analysis, because of the large number of CEP events that can be processed by a CEP system in a short period of time.

SUMMARY

An extensible analysis framework that may be used to analyze complex event flows is disclosed. A CEP engine may execute a CEP query (e.g., sequence of CEP operators) on an event stream. The CEP engine may generate an event flow (e.g., a log of the processed sequence of events) during execution of the CEP query. The event flow may be input into a sequence of analysis modules at an event flow debugger, where each analysis module performs an analysis function on its input data to produce output data. The output data of the final analysis module may be used to generate a user interface (UI) that represents the CEP query and the analyzed flow of events through the CEP query. For example, the UI may include a graph, where each node of the graph corresponds to an operator of the CEP query and each edge of the graph corresponds to a connection (e.g., stream) between operators.

Each analysis module in a sequence (e.g., "stack" of analysis modules) may be executable independently with respect to other analysis modules. Thus, analysis modules may be reordered within the sequence (e.g., via "drag-and-drop" operations). The analysis modules may execute analysis functions, such as filtering, root cause analysis, event propagation analysis, partition analysis, and replay analysis. The analysis stack may enable users to debug the CEP query (e.g., determine what may be causing erroneous CEP results and what corrective actions may be taken to prevent the erroneous CEP results).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a system includes a processor and a memory coupled to the processor. The memory stores instructions, that when executed by the processor, cause execution of an event flow debugger configured to receive input indicating a selection of a plurality of analysis modules. A first analysis module of the plurality of analysis modules is operable on an event flow associated with execution of a complex event processing (CEP) query. A second analysis module of the plurality of analysis modules is operable on data output from the first analysis module.

In another particular embodiment, a computer-implemented method includes receiving data representing an event flow that is based on execution of a CEP query. The event flow is associated with a plurality of events. The method includes executing a first software class. The first software class is configured to retrieve a particular event from the event flow, to execute a first analysis operation on the particular event to generate a first intermediate result, and to output the first intermediate result to a subsequent software class. The method also includes executing a second software class. The second software class is configured to receive a second intermediate result from a previous software class, to execute a second analysis operation on the second intermediate result to generate a final result, and to output the final result to an analysis user interface (UI). In a two-class embodiment, the first intermediate result may be the second intermediate result. In embodiments including more than two software classes, the second intermediate result may be generated from the first intermediate result by one or more intermediate modules.

In another particular embodiment, a computer-readable medium stores a CEP analysis module. The CEP analysis module is configured to receive CEP analysis data associated with an event flow generated by execution of a CEP query. The CEP analysis data is received from a first CEP analysis module or from the event flow via a software communication interface. The CEP analysis module is also configured to execute an analysis operation on the CEP analysis data to generate a CEP analysis result. The CEP analysis module is further configured to output the CEP analysis result to a second CEP analysis module or to a UI via the software communication interface.

Figure 1:
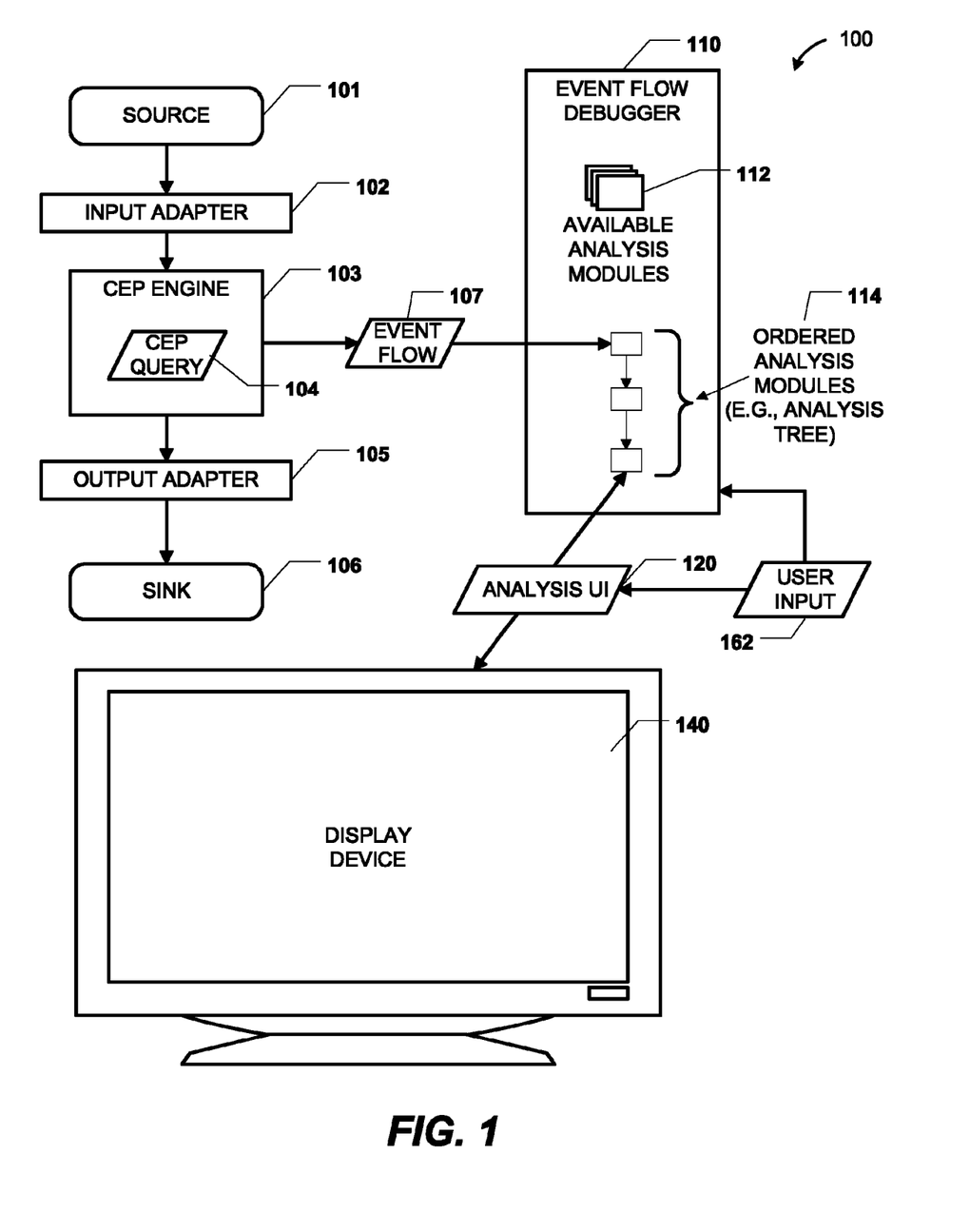
FIG. 1 is a diagram to illustrate a particular embodiment of a system of analyzing a complex event processing (CEP) query.

FIG. 1 is a diagram to illustrate a particular embodiment of a system 100 of analyzing a complex event processing (CEP) query (e.g., a representative CEP query 104).

A CEP query 104 may be executed by a CEP engine 103. In a particular embodiment, the CEP engine 103 receives events from one or more event sources (e.g., an illustrative source 101) via one or more input adapters (e.g., an illustrative input adapter 102) and transmits results to one or more event sinks (e.g., an illustrative sink 106) via one or more output adapters (e.g., an illustrative output adapter 105). In a particular embodiment, the input adapter 102 and the output adapter 105 are operable to convert events received from the source 101 into a native format of the CEP engine 103 and to convert results transmitted to the sink 106 from the native format of the CEP engine 103, respectively.

As an illustrative example, the CEP engine 103 may be part of an algorithmic stock trading application, the source 101 may provide real-time stock ticker prices, and the sink 106 may be an online stock broker's website. In such an example, the CEP query 104 may define the conditions under which a buy order or a sell order is submitted. For example, the CEP query 104 may indicate that a buy order for 100 shares should be placed when the price of a particular stock rises 5% during an hour and that a sell order for 100 shares should be placed when the price of a particular stock drops 5% during an hour. Thus, the CEP engine 103 may implement a stock trading algorithm based on real-time or near real-time stock prices.

During execution of the CEP query 104, the CEP engine 103 may produce data representing an event flow 107. The event flow 107 may indicate when each event processed by the CEP query 104 entered and exited individual operators of the CEP query 104. Thus, the event flow 107 may be used to reconstruct the flow of events through the CEP query 104. The event flow 107 may be received and used by the event flow debugger 110 while the CEP query 104 is executing or after the CEP query 104 has finished executing. The event flow 107 may thus include a sequence of events associated with the executing/previously executed CEP query 104. When the CEP query 104 has finished executing, the event flow 107 may be represented by a computer file (e.g., a file stored in a memory of the CEP engine 103).

The event flow debugger 110 may be configured to generate an analysis UI 120. The analysis UI 120 may display the event flow 107 and may display the results of performing debugging analysis operations on the event flow 107. The event flow debugger 110 includes a plurality of available analysis modules 112. The event flow debugger 110 may receive input (e.g., user input 162 at the analysis UI 120) that indicates a selection of particular analysis modules. Alternately, the event flow debugger 110 may receive input from some other input device. The event flow debugger 110 may generate a sequence of ordered analysis modules 114 based on the selection. For example, the ordered analysis modules 114 may be considered an "analysis stack" or an "analysis tree."

In a particular embodiment, each of the available analysis modules 112 is independently executable with respect to other analysis modules. Thus, the sequence of ordered analysis modules 114 may be reordered (e.g., based on user input 162 received at the analysis UI 120 that indicates a reordering operation). In a particular embodiment, analysis modules are configured to communicate with each other via a software communication interface. For example, each of the available analysis modules 112 may be a software class that implements a particular software interface that provides module-to-module communication. Each analysis module in the sequence of ordered analysis modules 114 may receive input data from the event flow 107 (in the case of the first analysis module) or from another analysis module (e.g., a previous analysis module in the analysis module stack), perform a particular analysis function on the input data, and transmit result data to another analysis module (e.g., a subsequent analysis module in the analysis module stack) or to the analysis UI 120 (in the case of the last analysis module). Thus, any number of additional analysis modules (e.g., software classes) may be executed after the first analysis module and before the last analysis module. Analysis modules and analysis operations are further described and illustrated with reference to FIGS. 2-3.

In a particular embodiment, the analysis UI 120 includes a graph having a plurality of nodes, where each node of the graph corresponds to an operator of the CEP query 104 and where each edge of the graph corresponds to a stream connection between operators of the CEP query 104. Thus, the CEP query 104 may be visualized as a set of nodes connected by streams where events flow in a direction from an input node to an output node. The event flow debugger 110 may transmit the analysis UI 120 for display to a display device 140.

In operation, the CEP engine 103 may generate the event flow 107 during execution of the CEP query 104. The event flow debugger 110 may receive the event flow 107 while the CEP query 104 is executing or after the CEP query 104 has completed execution. The event flow debugger 110 may receive input indicating a selection of particular analysis modules and may generate the sequence of ordered analysis modules 114 based on the input. The event flow debugger 110 may execute the sequence of ordered analysis modules 114 on the event flow to generate and modify the analysis UI 120 and may transmit the analysis UI 120 for display to the display device 140.

For example, the sequence of ordered analysis modules 114 may include a first (e.g., "bottom" of the analysis stack) analysis module, a second (e.g., "top" of the analysis stack) analysis module, and optional intermediate analysis module(s) located in the analysis stack between the first analysis module and the second analysis module. The first analysis module may retrieve a particular event from the event flow and output a first intermediate result. The second analysis module may receive a second intermediate result and may output a final result to the analysis UI 120. When the analysis stack does not include any intermediate modules between the first and second analysis modules, the first intermediate result may be the second intermediate result. Alternately, when the analysis stack includes one or more intermediate modules between the first and second analysis modules, the one or more intermediate modules may generate the second intermediate result from the first intermediate result.

It should be noted that the CEP engine 103 and the event flow debugger 110 may be located at the same computing device or at different computing devices that are communicatively coupled by a network (e.g., a local area network (LAN) or the Internet).

It will be appreciated that the system 100 of FIG. 1 may provide "stackable" analysis of complex event flows. Thus, at each stage of analysis, the system 100 of FIG. 1 may provide a user with multiple options on how to perform further analysis based on the results of a previous analysis. It will be appreciated that the "stack" of analysis modules may be seen as a particular path within a "tree" of analysis modules, where at each level of the tree a user may elect to branch off in one of multiple directions. It will also be appreciated that since analysis modules may be executed independently of other analysis modules and since all analysis modules may implement a particular software communication interface, the system 100 of FIG. 1 may be extended by software developers to support new (e.g., customized) analysis functions by creating new (e.g., customized) analysis software classes.

Figure 2:
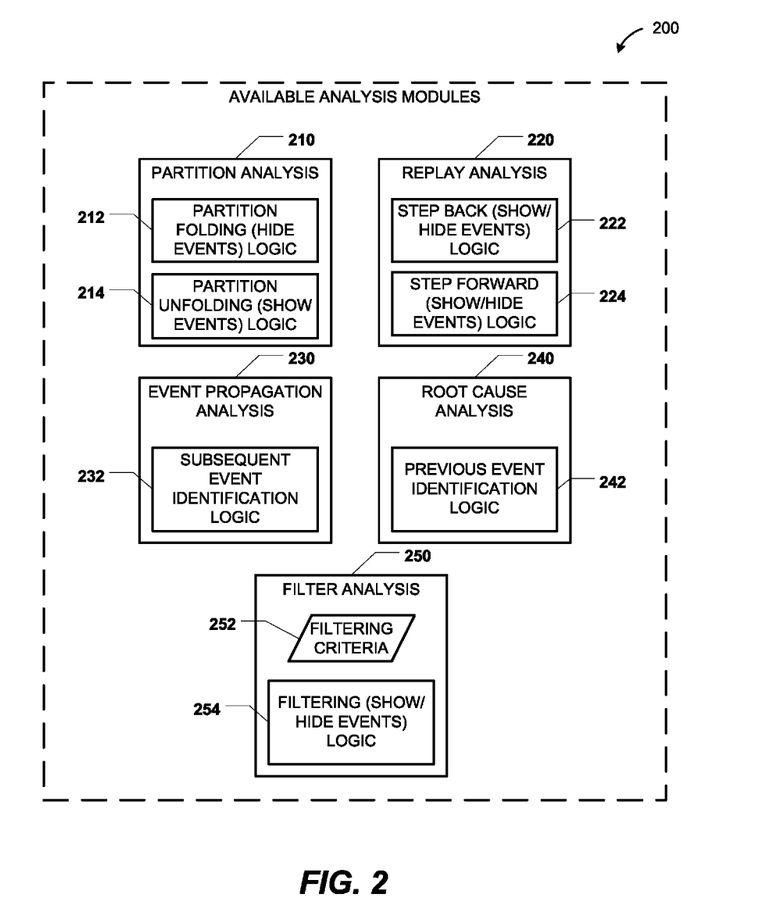
FIG. 2 is a block diagram to illustrate a particular embodiment of available analysis modules of the system of FIG. 1.

FIG. 2 is a block diagram to illustrate a particular embodiment of available analysis modules 200. In an illustrative embodiment, the available analysis modules 200 are the available analysis modules 112 of FIG. 1.

The available analysis modules 200 may include various analysis modules configured to execute various analysis functions on event data (e.g., an event flow). The available analysis modules 200 may be "stackable," such that the output from one analysis module is input to another. The available analysis modules 200 may also be selectable for inclusion in an ordered set of analysis modules. The available analysis modules 200 may be independently executable of each other, thereby enabling reordering of analysis modules within the ordered set.

The available analysis modules 200 may include a partition analysis module 210 configured to execute a partitioning analysis operation. The partition analysis module 210 may be executed to show events at an analysis UI (e.g., the analysis UI 120 of FIG. 1) that are processed by a particular partition generated by a partitioning operator of a CEP query (e.g., the CEP query 104 of FIG. 1). Generally, partitioning operators (also called grouping operators) may parallelize execution of a CEP query by routing events of an incoming event stream (e.g., represented by an incoming edge a graph displayed by the analysis UI 120 of FIG. 1) into one of a plurality of individual execution units. The outputs of the individual execution units may be merged to produce an output event stream (e.g., represented by an outgoing edge at the graph displayed by the analysis UI 120 of FIG. 1).

Since partitioning operators may generate any number of partitions and may include nested partitions, the partition analysis module 210 may include partition folding logic 212 and partition unfolding logic 214. The partition folding logic 212 may be executable to hide events at a particular partition (e.g., "fold" the particular partition). The partition unfolding logic 214 may be executable to show events at a particular partition (e.g., "unfold" the particular partition). The partition analysis module 210 may also be operable to "merge" (e.g., via a union operation) individual partitions, thereby "merging" events from the individual partitions. In a particular embodiment, partition folding and unfolding is performed in response to user input received at the analysis UI.

The available analysis modules 200 may also include a replay analysis module 220 configured to execute a replay analysis operation. The replay analysis module 220 may simulate a passage of time at an analysis UI (e.g., the analysis UI 120 of FIG. 1) based on one or more punctuation events (e.g., current time increment (CTI) events). Punctuation events, such as CTI events, may be used by a CEP engine (e.g., the CEP engine 103 of FIG. 1) to finalize events and reduce latency. For example, a CTI event may indicate that no subsequently received event will have a start time earlier than a timestamp of the CTI event.

The replay analysis module 220 may include step back logic 222 and step forward logic 224. The replay analysis module 220 may thus implement rewind, fast forward, and pause functionality. Based on execution of the step back logic 222 and the step forward logic 224, the replay analysis module 220 may show events at the analysis UI having event lifetimes that include a particular (e.g., user-defined) point in time and may hide events at the analysis UI having event lifetimes that do not include the particular point in time. Thus, events may "appear," "disappear," and "propagate" between CEP query operators based on execution of the step back logic 222 and step forward logic 224.

The available analysis modules 200 may further include an event propagation analysis (EPA) module 230 configured to execute an EPA operation. Generally, EPA may be performed with respect to a particular event to identify other subsequent (i.e., downstream) events that are affected by the particular event. The EPA module 230 may include logic 232 to identify such subsequent events. For example, a user may determine that a particular event displayed at an analysis UI (e.g., the analysis UI 120 of FIG. 1) includes erroneous data and may want to find downstream events that are affected by the particular event, since the downstream events may also include erroneous data. The user may add the EPA module 230 to the stack of analysis modules to identify such downstream events.

The available analysis modules 200 may include a root cause analysis (RCA) module 240 configured to execute a RCA operation. RCA may be understood as the inverse of EPA. Thus, RCA may be performed with respect to a particular event to identify previous (e.g., upstream) events that affect the particular event. The RCA module 240 may include logic 242 to identify such previous events. For example, a user may determine that a particular event displayed at an analysis UI (e.g., the analysis UI 120 of FIG. 1) includes erroneous data and may want to find upstream events that affected the particular event in an attempt to debug the problem. The user may add the RCA module 240 to the stack of analysis modules to identify such upstream events.

The available analysis modules 200 may also include a filtering analysis module 250 configured to execute a filtering analysis operation. The filtering analysis module 250 may include filtering logic 254 to filter the events displayed at an analysis UI (e.g., the analysis UI 120 of FIG. 1). For example, the filtering logic 254 may show events that satisfy a filtering criteria 252 and hide events that do not satisfy the filtering criteria 252. The filtering criteria 252 may be user-defined. For example, the filtering criteria 252 may be based on event kinds, event start times, event end times, new event end times, event log times, event latency, event payloads, or any combination thereof. In a particular embodiment, the filtering analysis module 250 may filter events at individual operators of a CEP query (e.g., the CEP query 104 of FIG. 1) as well as across all operators of a CEP query.

It will be appreciated that the available analysis modules 200 may provide combinable (e.g., "stackable") analyses. For example, a user may combine application of the replay analysis module 220 and the partition analysis module 210 to step forwards and backwards through the flow of events in an individual partition. In such an example, the partition analysis module 210 may precede the replay analysis module 220 in the analysis stack. The partition analysis module 210 may first categorize event flow data by partition and the replay analysis module 220 may then step forward and backwards through the event flow within individual partitions. As another example, a user could combine application of the filtering analysis module 250, the RCA module 240, and the replay analysis module 220 to identify all events of the kind "Insert" that caused an erroneous particular event and view flow through a CEP query step-by-step. In such an example, the filtering analysis module 250 may precede the RCA module 240 in the analysis stack and the RCA module 240 may precede the replay analysis module 220 in the analysis stack. The filtering analysis module 250 may first hide all events at the analysis UI that are not "Insert" events. The RCA module 240 may then receive a selection of the erroneous particular event and identify upstream events that affected the erroneous particular event. The replay analysis module 220 may then provide a step-by-step view of the flow of the upstream events through the CEP query.

Figure 3:
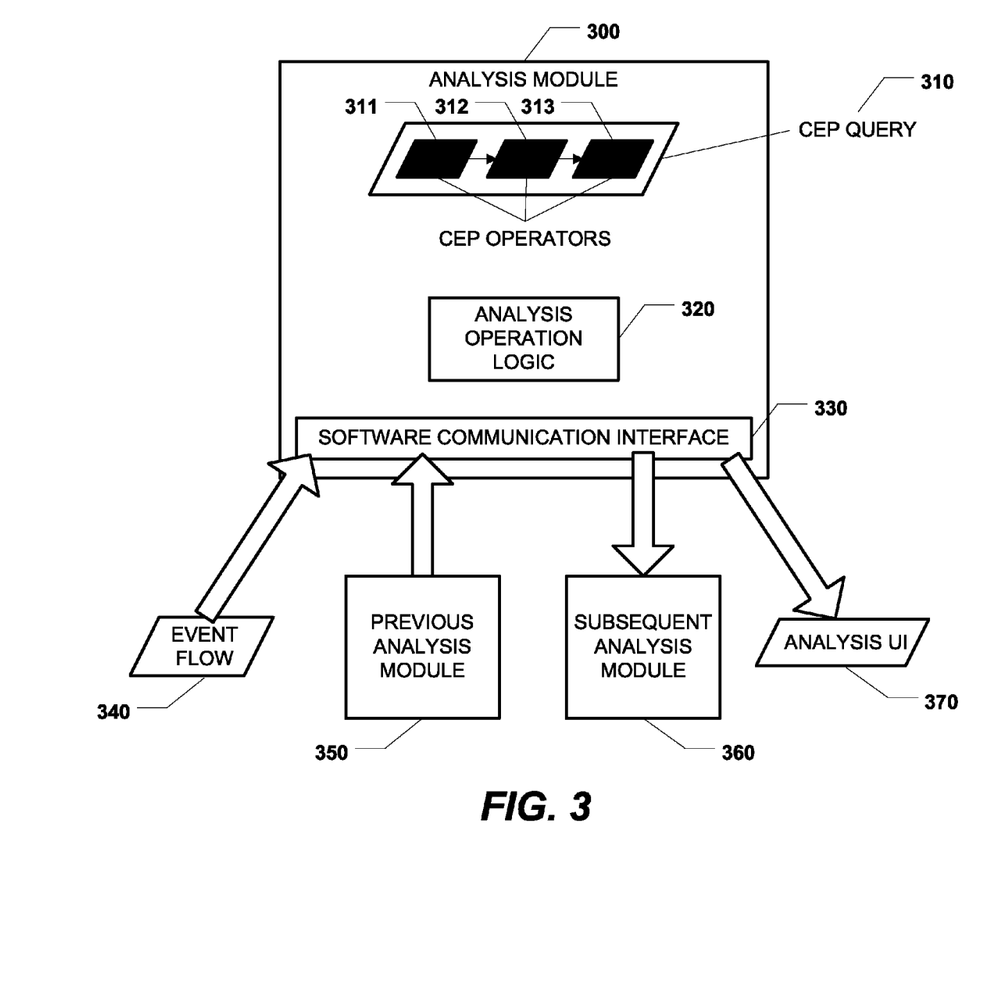
FIG. 3 is a block diagram to illustrate a particular embodiment of one of the analysis modules of FIG. 1 or FIG. 2.

FIG. 3 is a block diagram to illustrate a particular embodiment of an analysis module 300. In an illustrative embodiment, the analysis module 300 is one of the available analysis modules 112 of FIG. 1 or one of the available analysis modules 200 of FIG. 2.

The analysis module 300 may include or have access to data representing a CEP query 310 being analyzed. For example, when the analysis module 300 is a software class, the CEP query 310 may be a data member of the software class or may be accessible via inheritance from a CEP query class. The data representing the CEP query 310 may include data representing the nature and order of individual operators of the CEP query 310 (e.g., illustrative CEP operators 311, 312, and 313). The analysis module 300 may also include analysis operation logic 320 configured to execute an analysis operation. For example, the analysis operation logic 320 may be one of the logic 212, 214, 222, 224, 232, 242, or 254 of FIG. 2.

The analysis module 300 may further include a software communication interface 330. For example, in an object-oriented system, the analysis module 300 may be a software class that implements the software communication interface 330. The software communication interface 330 may enable the analysis module 300 to receive CEP analysis data from an event flow 340 or from a previous analysis module 350 in an analysis stack. The software communication interface 330 may also enable the analysis module 300 to output CEP result data (e.g., generated by execution of the analysis operation logic 320) to an analysis UI 370 or to a subsequent analysis module 360 in the analysis stack.

It will be appreciated that the analysis module 300 may enable stackable analysis of complex event flows. It will also be appreciated the analysis module 300 does not depend on, and thus may be executed independently of, other analysis modules. The analysis module 300 may therefore be provided as a parent software class or template that users may leverage to define custom analyses (e.g., by providing custom definitions of the analysis operation logic 320).

Figure 4:
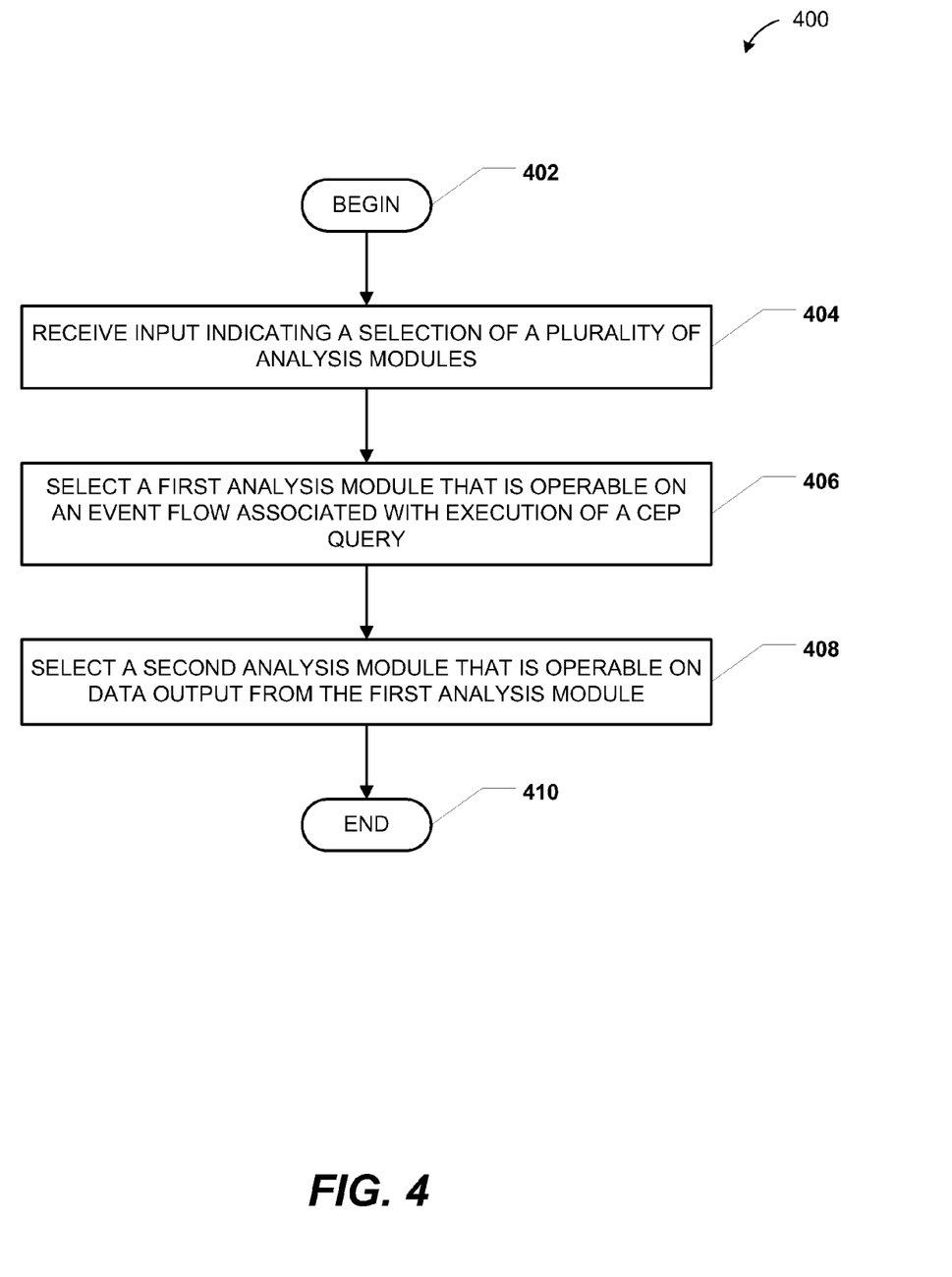
FIG. 4 is a flow diagram to illustrate a particular embodiment of a method of analyzing a CEP query.

FIG. 4 is a flow diagram to illustrate a particular embodiment of a method 400 of analyzing a CEP query. In an illustrative embodiment, the method 400 may be performed at the system 100 of FIG. 1.

The method 400 begins at 402. The method 400 includes receiving input (e.g., at an analysis UI) indicating a selection of a plurality of analysis modules, at 404. For example, in FIG. 1, input may be received at the analysis UI 120, where the input indicates a selection of a plurality of the available analysis modules 112.

The method 400 also includes selecting a first analysis module that is operable on an event flow that is associated with execution of a CEP query, at 406. The method 400 further includes selecting a second analysis module that is operable on data output from the first analysis module, at 408. For example, in FIG. 1, a first analysis module of the sequence of ordered analysis modules 114 may be selected to operate on the event flow 107, and a second analysis module of the ordered sequence of analysis modules 114 may be selected to operate on data output from the first analysis module (and optionally output data to the analysis UI 120). The method 400 ends, at 410.

It will be appreciated that the method 400 of FIG. 4 may enable "stackable" analysis of a CEP event flow. It will also be appreciated that the method 400 of FIG. 4 may enable visual debugging of CEP queries at an analysis UI.

Figure 5:
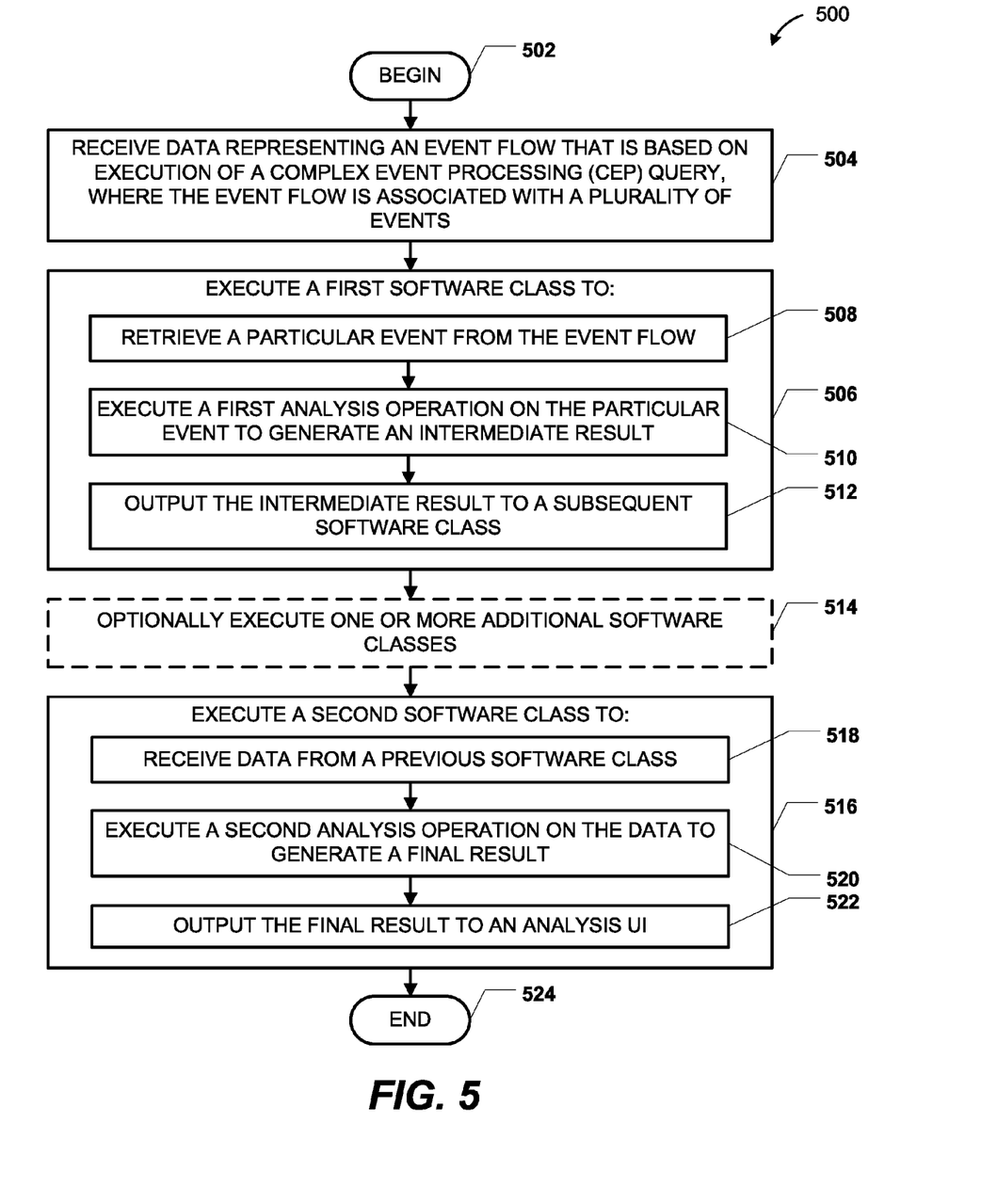
FIG. 5 is a flow diagram to illustrate another particular embodiment of a method of analyzing a CEP query.

FIG. 5 is a flow diagram to illustrate another particular embodiment of a method of analyzing a CEP query. In an illustrative embodiment, the method 500 may be performed at the system 100 of FIG. 1.

The method 500 begins at 502. The method 500 includes receiving data representing an event flow that is based on execution of a CEP query, at 504. The event flow is associated with a plurality of events. For example, in FIG. 1, the data representing the event flow 107 may be received.

The method 500 includes executing a first software class, at 506. The first software class is executable to retrieve a particular event from the event flow, at 508. The first software class is also executable to execute a first analysis operation on the particular event to generate an intermediate result, at 510. The first software class is further executable to output the intermediate result to a subsequent software class, at 512. For example, in FIG. 1, a first software class representing a first analysis module of the sequence of ordered analysis modules 114 may be executed. For example, the first analysis module may be considered the "bottom" analysis module of an analysis stack.

The method 500 optionally includes executing one or more additional software classes, at 514, and further includes executing a second (e.g., "top") software class, at 516. The second software class is executable to receive data from a previous software class, at 518. The second software class is also executable to execute a second analysis operation on the data to generate a final result, at 520. The second software class is further executable to output the final result to an analysis UI, at 522. Thus, any number of additional analysis modules may be placed in an analysis stack between the "bottom" analysis module, which retrieves events from the event flow, and a "top" analysis module represented by the second software class. The final ("top") analysis module outputs results to the analysis UI. For example, in FIG. 1, a second software class representing a second analysis module of the ordered analysis modules 114 may be executed, where the second analysis module may be considered the "top" analysis module of the analysis stack. The method 500 ends, at 524.

Figure 6:
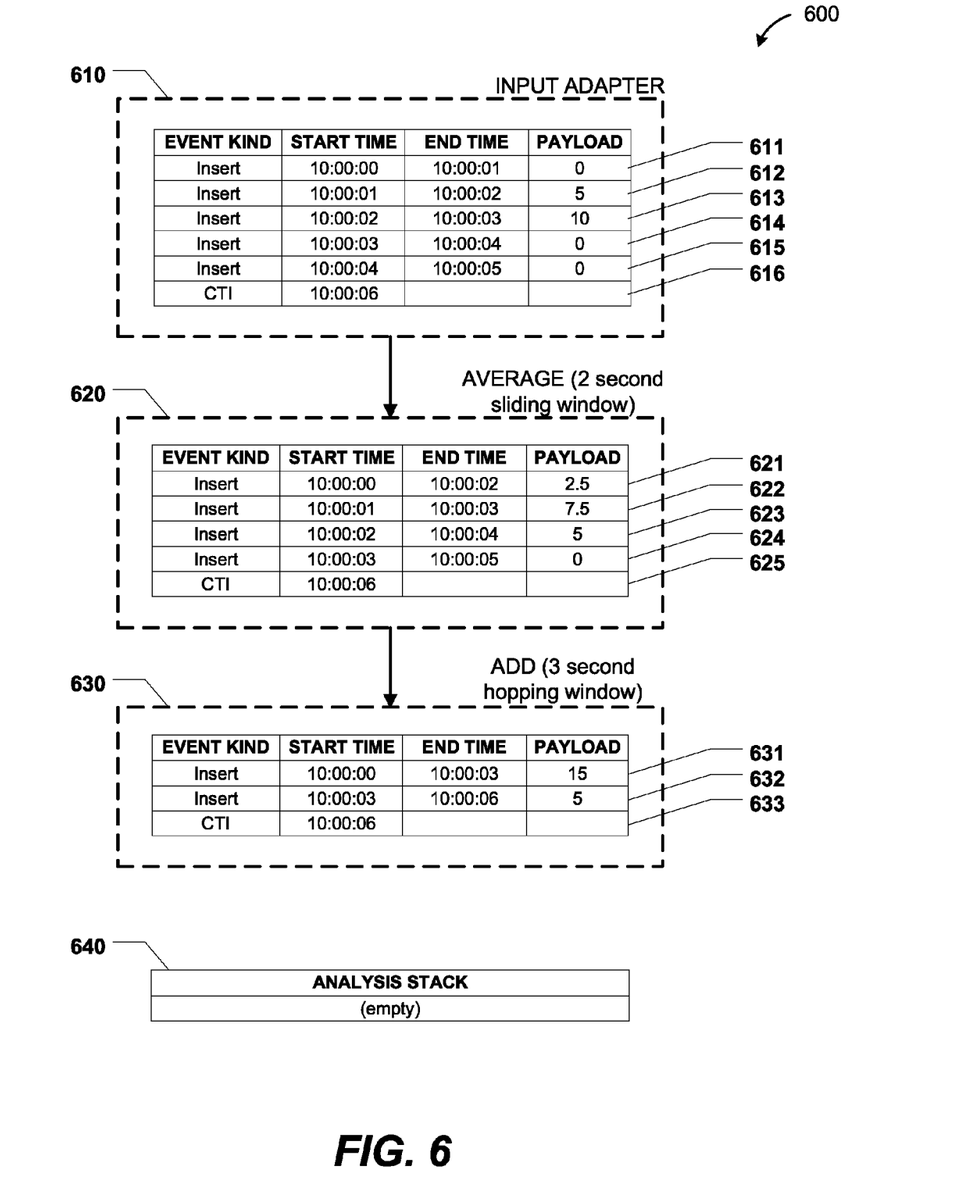
FIG. 6 is a diagram to illustrate a particular embodiment of the analysis user interface (UI) of FIG. 1.

FIG. 6 is a diagram to illustrate a particular embodiment of an analysis UI 600. In an illustrative embodiment, the analysis UI 600 is the analysis UI 120 of FIG. 1.

In the particular embodiment illustrated, the analysis UI 600 represents an event flow of a CEP query that includes an input adapter 610, an AVERAGE two second sliding window operator 620, an ADD three second hopping window operator 630, and an output adapter (not shown). The analysis UI 600 also indicates that an analysis stack 640 is currently empty. Thus, the analysis UI 600 of FIG. 6 may depict event flow through the CEP prior to application of any analysis operations.

The analysis UI 600 indicates that six events entered the CEP query during the time period being displayed at the analysis UI 600. Five events are Insert events 611-615 (i.e., new events) and the sixth event is a CTI event 616.

Generally, a sliding window operator may perform an aggregate calculation on events that enter the operator during a time of the sliding window. Each of the aggregate calculations produces an event. Thus, the AVERAGE two second sliding window operator 620 calculates a two second sliding average of event payloads of events that enter the AVERAGE two second sliding window operator 620 from the input adapter 610. For example, an Insert event 621 has a payload of 2.5 corresponding to a sliding two second average of the events 611 and 612. Similarly, the Insert events 622-624 have payloads corresponding to sliding two second averages of the Insert events 612-613, 613-614, and 614-615, respectively. The AVERAGE two second sliding window operator 620 also has a CTI event 625 that is similar to the CTI event 616.

Generally, a hopping window operator may perform an aggregate calculation on events that enter the operator during a time of the hopping (i.e., discrete) window. Thus, whereas a sliding window overlaps, a hopping window does not overlap. Each aggregate calculation produces an event. Thus, the ADD three second hopping window operator 630 calculates a three second sum of event payloads of events that enter the ADD three second hopping window operator 630 from the AVERAGE two second sliding window operator 620. For example, an Insert event 631 has a payload 15 corresponding to the sum of the Insert events 621-623. An insert event 632 has a payload 5 corresponding to the sum of the Insert events 623-624. The ADD three second hopping window operator 630 has a CTI event 633 similar to the CTI event 616.

Figure 7:
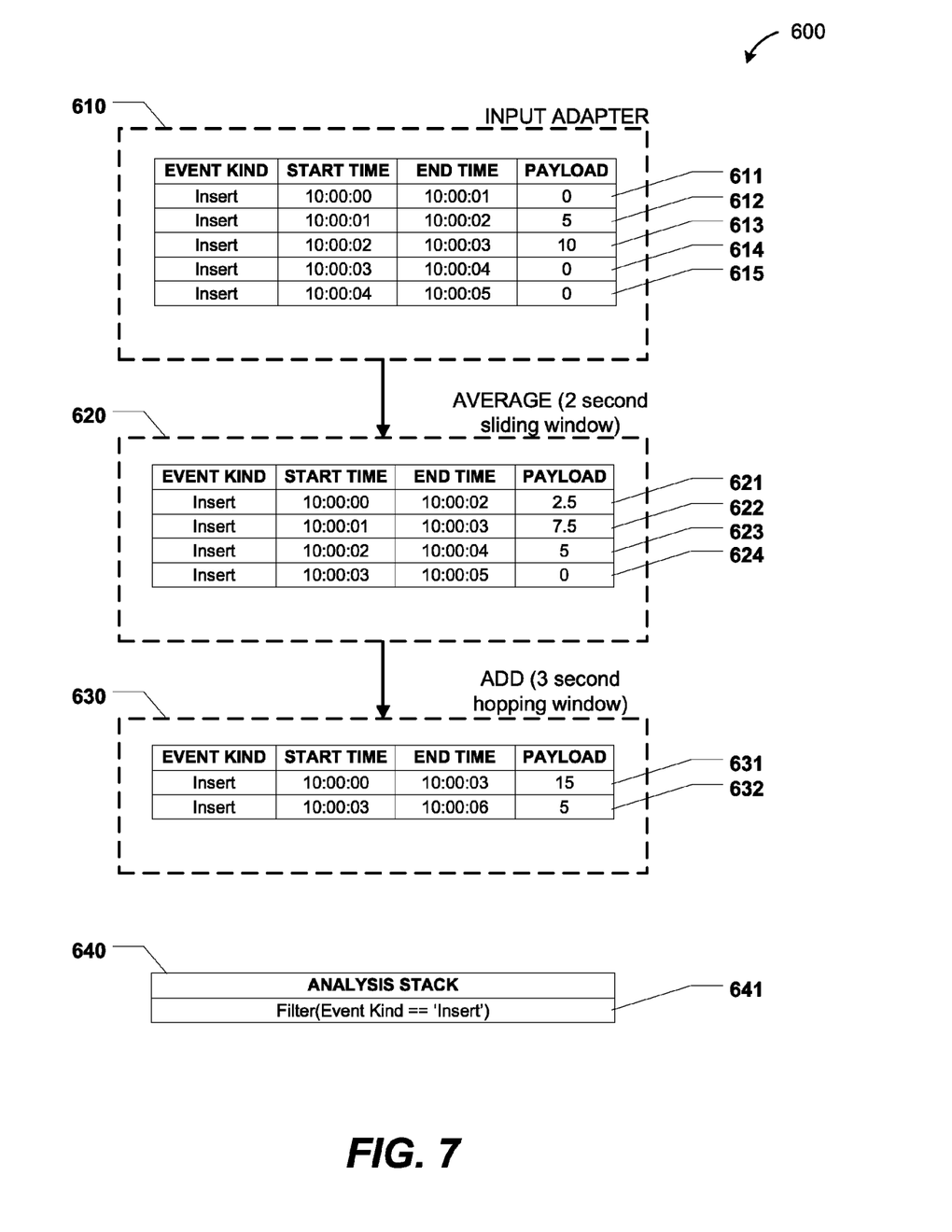
FIG. 7 is a diagram to illustrate the analysis UI of FIG. 6 with a first applied analysis module.
Figure 8:
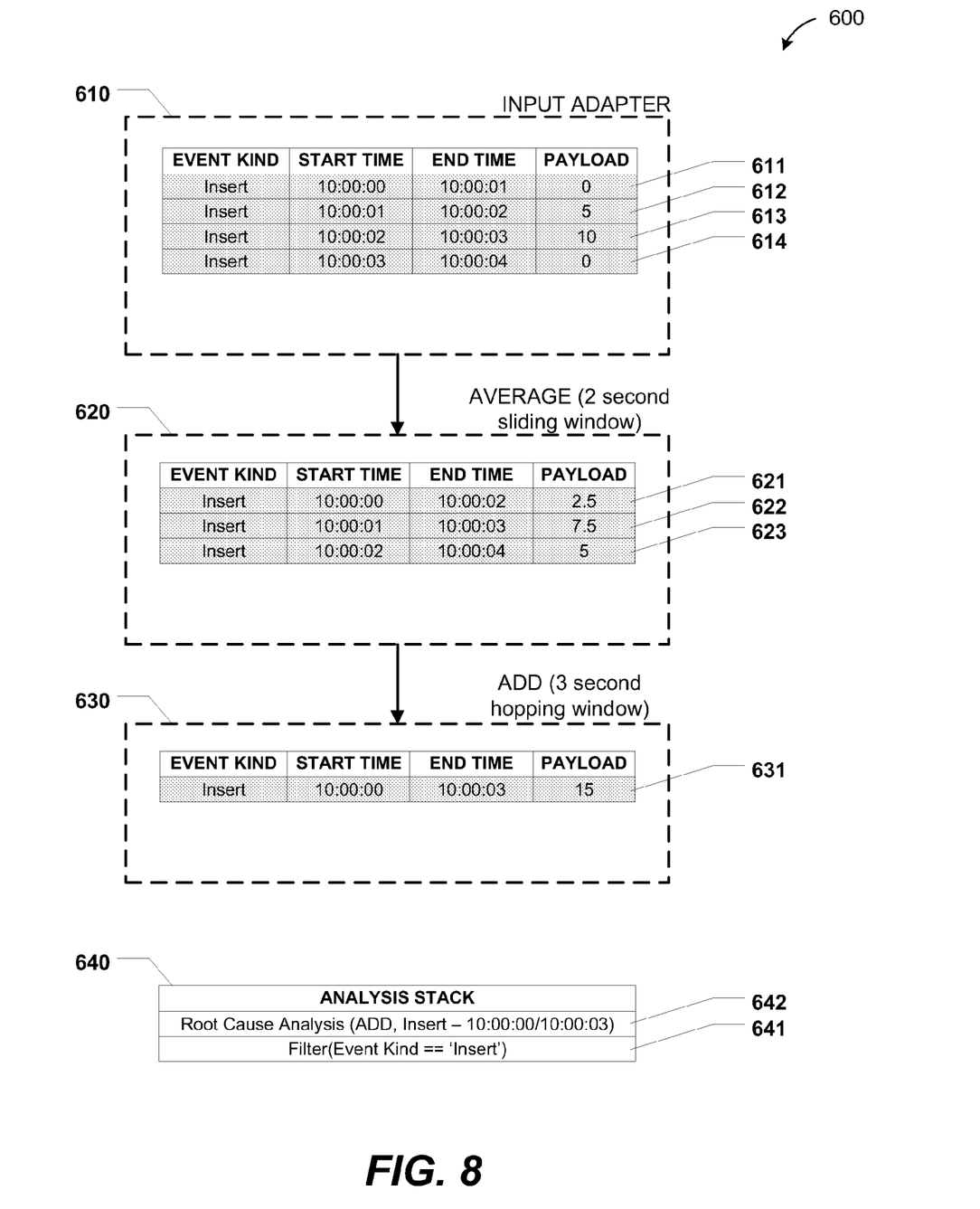
FIG. 8 is a diagram to illustrate the analysis UI of FIG. 7 with a second applied analysis module.
Figure 9:
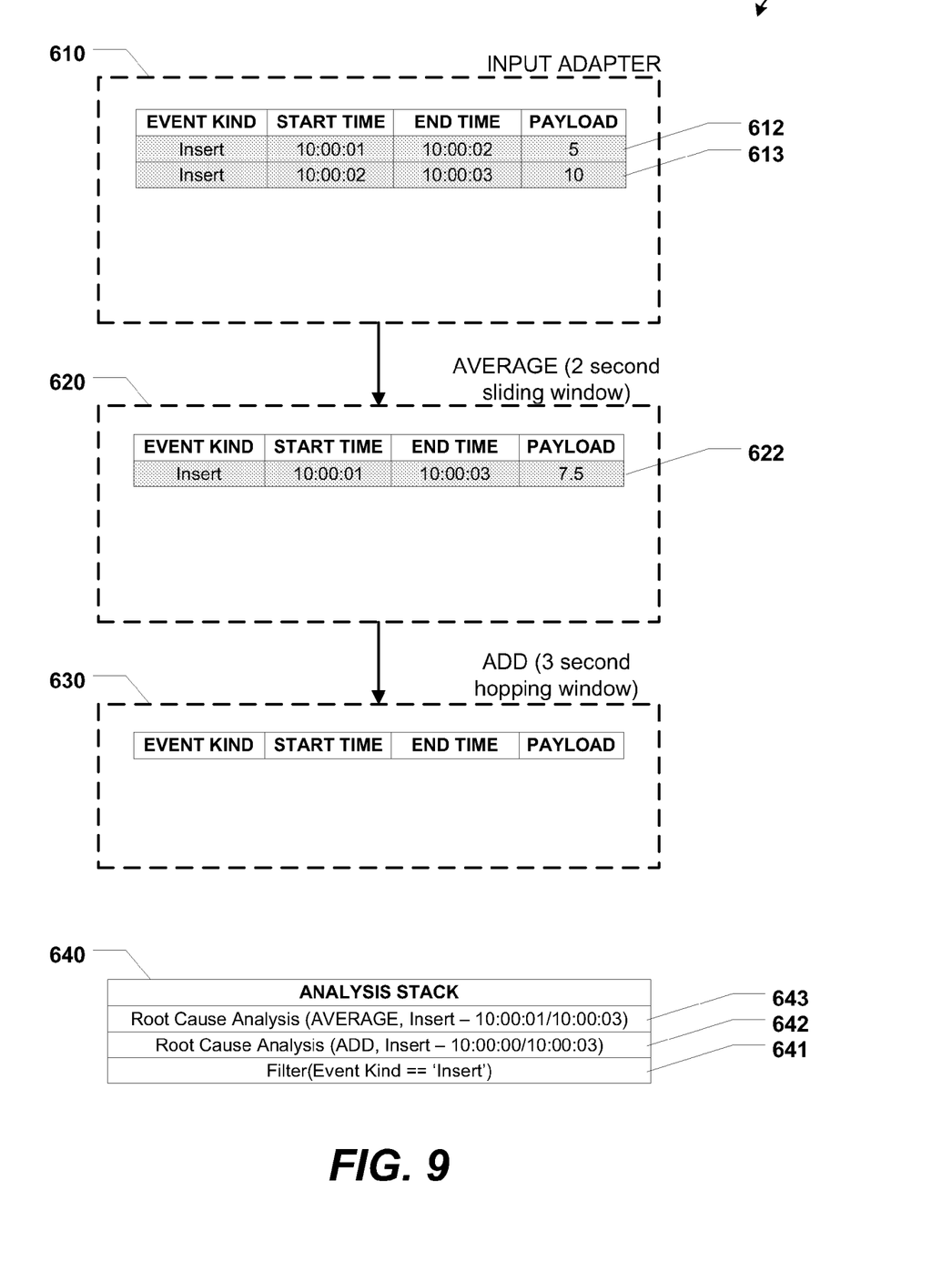
FIG. 9 is a diagram to illustrate the analysis UI of FIG. 8 with a third applied analysis module.

FIGS. 7-9 are diagrams to illustrate the effects of applying the analysis stack 640 on the analysis UI 600 of FIG. 6 as analysis modules are added to the analysis stack 640. FIG. 7 illustrates the application of a first analysis module, FIG. 8 illustrates the application of a second analysis module "stacked" on the first analysis module, and FIG. 9 illustrates the application of a third analysis module "stacked" on the first and second analysis modules.

In FIG. 7, the analysis stack 640 includes a first analysis module 641. In the particular embodiment illustrated, the first analysis module 641 is a filtering analysis module that filters the events displayed at the operators 610-630 based on event kind, such that events having the event kind "Insert" are displayed and other events are hidden. Thus, upon application of the first analysis module 641, the CTI events 616, 625, and 633 are hidden while the Insert events 611-615, 621-624, and 631-632 remain displayed, as illustrated in FIG. 7.

In FIG. 8, the analysis stack 640 includes a second analysis module 642. In the particular embodiment illustrated, the second analysis module 642 is a root cause analysis (RCA) module that performs RCA with respect to the event 631. Upon application of the second analysis module 642, upstream events 611-614 and 621-623 that affected the event 631 are identified. In a particular embodiment, identifying the event 631 and the upstream events 611-614 and 621-623 includes highlighting the events 631, 611-614, and 621-623 at the analysis UI 600, as illustrated in FIG. 8. Events that are not part of the RCA, such as the Insert events 615 and 632 may be hidden.

In FIG. 9, the analysis stack 640 includes a third analysis module 643. In the particular embodiment illustrated, the third analysis module 643 is a RCA module that performs RCA with respect to the event 622. Upon application of the third analysis module 643, upstream events 612-613 that affected the event 622 are identified. In a particular embodiment, identifying the event 622 and the upstream events 612-613 includes highlighting the events 622 and 612-613 at the analysis UI 600, as illustrated in FIG. 9. Events that are not part of the RCA, such as the Insert events 611, 614, 621, 623, and 631 may be hidden.

It will be appreciated that stackable analyses as illustrated in FIGS. 6-9 may enable granular examination of complex event flows and visual debugging of CEP queries.

Figure 10:
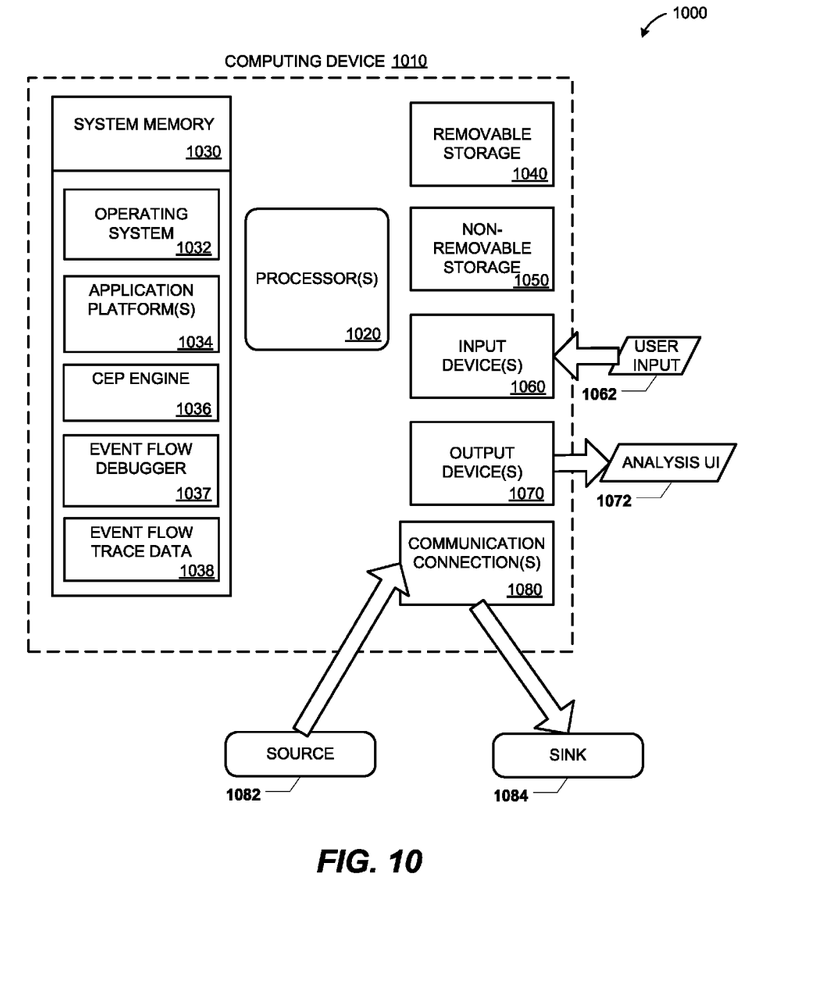
FIG. 10 is a block diagram of a computing environment including a computing device operable to support embodiments of computer-implemented methods, computer program products, and system components as illustrated in FIGS. 1-9.

FIG. 10 depicts a block diagram of a computing environment 1000 including a computing device 1010 operable to support embodiments of computer-implemented methods, computer program products, and system components according to the present disclosure.

The computing device 1010 includes at least one processor 1020 and a system memory 1030. Depending on the configuration and type of computing device, the system memory 1030 may be volatile (such as random access memory or "RAM"), non-volatile (such as read-only memory or "ROM," flash memory, and similar memory devices that maintain stored data even when power is not provided), or some combination of the two. The system memory 1030 typically includes an operating system 1032, one or more application platforms 1034, one or more applications, and program data. For example, the system memory 1030 may include a CEP engine 1036, an event flow debugger 1037, and event flow trace data 1038. In an illustrative embodiment, the CEP engine 1036 is the CEP engine 103 of FIG. 1, the event flow debugger 1037 is the event flow debugger 110 of FIG. 1, and the event flow trace data 1038 represents the event flow 107 of FIG. 1.

The computing device 1010 may also have additional features or functionality. For example, the computing device 1010 may also include removable and/or non-removable additional data storage devices such as magnetic disks, optical disks, tape, and standard-sized or flash memory cards. Such additional storage is illustrated in FIG. 10 by removable storage 1040 and non-removable storage 1050. Computer storage media may include volatile and/or non-volatile storage and removable and/or non-removable media implemented in any technology for storage of information such as computer-readable instructions, data structures, program components or other data. The system memory 1030, the removable storage 1040 and the non-removable storage 1050 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 1010. Any such computer storage media may be part of the computing device 1010.

The computing device 1010 may also have input device(s) 1060, such as a keyboard, mouse, pen, voice input device, touch input device, etc. Output device(s) 1070, such as a display, speakers, printer, etc. may also be included. For example, the input device(s) 1060 may receive user input 1062 and the output device(s) 1070 may display an analysis UI 1072 (e.g., the analysis UI 120 of FIG. 1). The computing device 1010 also contains one or more communication connections 1080 that allow the computing device 1010 to communicate with other computing devices over a wired or a wireless network. For example, the other computing devices may include a source 1082 (e.g., the source 101 of FIG. 1) and a sink 1084 (e.g., the sink 106 of FIG. 1). The source 1082 and the sink 1084 may be parts of a CEP system, such as a manufacturing system, a process control system, a utilities system, a financial trading system (e.g., as described with reference to FIG. 1), a web application, an information technology system, or a data center monitoring system.

It will be appreciated that not all of the components or devices illustrated in FIG. 10 or otherwise described in the previous paragraphs are necessary to support embodiments as herein described. For example, the removable storage 1040 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system, comprising:
   a processor; and
   a memory coupled to the processor, the memory storing instructions, that when executed by the processor, cause execution of an event flow debugger configured to:
   receive input indicating a selection of a plurality of analysis modules;
   wherein a first analysis module of the selected plurality of analysis modules is operable on an event flow associated with execution of a complex event processing (CEP) query, and
   wherein a second analysis module of the selected plurality of analysis modules is operable on data output from the first analysis module.

2. The system of claim 1, wherein each of the plurality of analysis modules is independently executable with respect to other analysis modules.

3. The system of claim 1, wherein the input further indicates an ordering of the plurality of analysis modules and wherein each of the plurality of analysis modules is further configured to:
   receive data from a previous analysis module in the ordering; and
   transmit data to a subsequent analysis module in the ordering.

4. The system of claim 3, wherein each of the plurality of analysis modules is configured to receive and transmit data via a software communication interface.

5. The system of claim 1, wherein the event flow debugger is further configured to receive input indicating a reordering of the plurality of analysis modules.

6. The system of claim 1, wherein the plurality of analysis modules comprises at least one analysis module configured to execute a partitioning analysis operation.

7. The system of claim 6, wherein the partitioning analysis operation is executable to show events at the analysis UI that are processed by a particular partition generated by a partitioning operator of the CEP query.

8. The system of claim 6, wherein the partitioning analysis operation is executable to hide events at an analysis user interface that are processed by a particular partition generated by a partitioning operator of the CEP query and to merge events that are processed by multiple partitions into events of a merged partition.

9. The system of claim 1, wherein the plurality of analysis modules comprises an analysis module configured to execute a replay analysis operation to simulate a passage of time at an analysis user interface based on one or more punctuation events.

10. The system of claim 9, wherein the replay analysis operation is further executable to:
    show events at an analysis user interface (UI) having event lifetimes that include a particular point in the passage of time; and
    hide events at the analysis UI having event lifetimes that do not include the particular point in the passage of time.

11. The system of claim 10, wherein the particular point in the passage of time is user-defined.

12. The system of claim 1, wherein the plurality of analysis modules comprises an analysis module configured to execute an event propagation analysis operation with respect to a particular event to identify one or more subsequent events at an analysis user interface that are affected by the particular event.

13. The system of claim 1, wherein the plurality of analysis modules comprises an analysis module configured to execute a root cause analysis operation with respect to a particular event to identify one or more previous events at an analysis user interface that affect the particular event.

14. The system of claim 1, wherein the plurality of analysis modules comprises an analysis module configured to execute a filtering analysis operation to show those events at an analysis user interface that satisfy a filtering criteria.

15. The system of claim 14, wherein the filtering analysis operation is executable with respect to a particular operator of the CEP query or with respect to the entire CEP query.

16. The system of claim 14, wherein the filtering criteria is based on event kinds, event start times, event end times, new event end times, event log times, event latency, event payloads, or any combination thereof.

17. A computer-implemented method, comprising:
receiving data representing an event flow that is based on execution of a complex event processing (CEP) query, wherein the event flow is associated with a plurality of events;
executing a first software class configured to:
retrieve a particular event from the event flow;
execute a first analysis operation on the particular event to generate a first intermediate result; and
output the first intermediate result to a subsequent software class; and
executing a second software class configured to:
receive a second intermediate result from a previous software class;
execute a second analysis operation on the second intermediate result to generate a final result; and
output the final result to an analysis user interface (UI).

18. The computer-implemented method of claim 17, further comprising executing one or more additional software classes after executing the first software class and before executing the second software class, wherein the one or more software classes are operable to generate the second intermediate result from the first intermediate result.

19. A non-transitory computer-readable medium storing a complex event processing (CEP) analysis module configured to:
receive CEP analysis data associated with an event flow generated by execution of a CEP query by an event flow debugger, the event flow debugger configured to receive input indicating a selection of plurality of analysis modules, wherein the CEP analysis data is received from a first CEP analysis module or from the event flow, and wherein the CEP analysis data is received via a software communication interface;
execute a first analysis operation on the CEP analysis data at the first CEP analysis module to generate a first CEP analysis output;
execute a second analysis operation at a second CEP analysis module on the first CEP analysis output to generate a CEP analysis result; and
output the CEP analysis result to a user interface via the software communication interface.

20. The computer-readable medium of claim 19, wherein the CEP analysis module comprises a software class that implements the software communication interface, wherein the CEP analysis module is selectable for inclusion in an ordered set of CEP analysis modules executable to modify the user interface, and wherein the CEP analysis module is independently executable with respect to other analysis modules in the ordered set of CEP analysis modules.

* * * * *